(12) United States Patent
Farina et al.

(10) Patent No.: US 10,122,266 B1
(45) Date of Patent: Nov. 6, 2018

(54) POWER SUPPLY CHARGE PUMP AND PROTECTION CIRCUIT

(71) Applicant: Maxim Integrated Products, Inc., San Jose, CA (US)

(72) Inventors: Marco Farina, Milan (IT); Mauro Ranzato, Torre d'Isola (IT); Gianluca Mariano, San Martino Siccomario (IT)

(73) Assignee: Maxim Integrated Products, Inc., San Jose, CA (US)

( * ) Notice: Subject to any disclaimer, the term of this patent is extended or adjusted under 35 U.S.C. 154(b) by 416 days.

(21) Appl. No.: 14/929,181

(22) Filed: Oct. 30, 2015

Related U.S. Application Data

(62) Division of application No. 13/931,601, filed on Jun. 28, 2013, now Pat. No. 9,312,688.

(60) Provisional application No. 61/744,547, filed on Sep. 28, 2012.

(51) Int. Cl.
*H02M 3/07* (2006.01)
*H02H 7/20* (2006.01)
*H02H 11/00* (2006.01)

(52) U.S. Cl.
CPC ........... *H02M 3/07* (2013.01); *H02H 7/20* (2013.01); *H02H 11/002* (2013.01); *H02H 11/003* (2013.01)

(58) Field of Classification Search
CPC ........ H02M 3/07; H02M 7/20; H02H 11/002; H02H 11/003
See application file for complete search history.

(56) References Cited

U.S. PATENT DOCUMENTS

| | | | |
|---|---|---|---|
| 6,141,195 A | 10/2000 | Buhring et al. | |
| 6,538,930 B2 * | 3/2003 | Ishii | G11C 5/145 327/534 |
| 2004/0080361 A1 * | 4/2004 | Henry | H02M 3/07 327/536 |
| 2005/0162140 A1 | 7/2005 | Hirst | |
| 2009/0052103 A1 | 2/2009 | Beny | |
| 2011/0195744 A1 * | 8/2011 | Zhang | H02H 11/003 455/550.1 |

OTHER PUBLICATIONS

LTC4356—Technical Brochure, "UV, OV and Reverse Supply Protection Controller", Linear Technology Corportion, Dec. 31, 2010, pp. 1-16.
MAX16126/MAX 16127—Technical Brochure, "Load-Dump/Reverse-Voltage Protection Circuits", Maxim Integrated, Dec. 31, 2012, pp. 1-19.

* cited by examiner

*Primary Examiner* — Scott Bauer
(74) *Attorney, Agent, or Firm* — TIPS Group

(57) ABSTRACT

In an embodiment, set forth by way of example and not limitation, an integrated circuit includes charge pump circuitry formed on an integrated circuit (IC) chip, a first protective circuit formed on the integrated circuit chip and coupling the first output node to a first IC port, a second protective circuit formed on the integrated circuit chip and coupling the second output node to a second IC port, and a third protective circuit formed on the integrated circuit chip and coupling the power input node to a power input IC port.

8 Claims, 2 Drawing Sheets

POWER SUPPLY CHARGE PUMP AND PROTECTION CIRCUIT

CROSS REFERENCE TO RELATED APPLICATION(S)

This application is a division of U.S. Ser. No. 13/931,601, filed Jun. 28, 2013 which claims the benefit of U.S. Ser. No. 61/744,547, filed Sep. 28, 2012, both of which are incorporated herein by reference.

BACKGROUND

Automotive battery-powered applications preferably include reverse-voltage protection to prevent damage to the downstream circuitry (e.g. power supplies) by high voltage surges, reverse battery and cold crank faults. Also many mobile devices derive their power or recharge their internal batteries from multiple alternative inputs such as AC wall adaptors and USB ports. A user may unknowingly plug in a wrong adaptor, thereby damaging the device with a high or even a negative power supply voltage.

A blocking diode in series with the power supply has been used to address this problem, but such a solution causes extra power loss, generates heat and reduces the available supply voltage range. In automotive applications, the extra voltage drop across the diode is particularly undesirable during cold crank. More power efficient solutions have been designed to replace the diode with a p-channel MOSFET or an n-channel MOSFET at expenses of a significant amount of external components, thus increasing costs and space of the board. The number of external components can be even higher to include reverse current protection in cold crank faults.

By way of example, Linear Technology Corporation of Milpitas Calif. has a product number LTC4365 which provides undervoltage, overvoltage and reverse-supply protection. The LTC4365 includes a pair of back-to-back MOSFETs controlled by a common GATE signal to open or close a connection between VIN (e.g. a battery voltage supply) and VOUT (e.g. to downstream circuitry such as a powers supply).

While the LTC4365 does provide undervoltage, overvoltage and reverse supply protection, it does not provide for the protection of the oxide of the external MOSFETs with, for example, a zener diode because the MOSFETs would be turned on during reverse battery faults, thereby potentially damaging the downstream circuitry. Instead, the LTC4365 limits the input voltage and uses an expensive TVS load dump protection. Furthermore, the LTC4365 requires a high speed comparator to follow fast negative transients.

These and other limitations of the prior art will become apparent to those of skill in the art upon a reading of the following descriptions and a study of the several figures of the drawing.

SUMMARY

Embodiments disclosed herein are useful for automotive and industrial applications where load circuitry must be protected from high voltage surges, reverse battery and cold crank faults as well as in other applications wherein downstream circuitry is to be protected from voltage source transients, drops, reversals and other anomalies.

In an embodiment, set forth by way of example and not limitation, a power supply protection system includes: a first metal oxide field effect transistor (MOSFET) having a first source, a first drain coupled to an input node, and a first gate; a second MOSFET having a second source coupled to the first source, a second drain coupled to an output node and a second gate coupled to the first gate, whereby the first MOSFET and the second MOSFET are coupled back-to-back; a zener diode coupled between the first and second sources and the first and second gates; and charge pump circuitry coupled across the zener diode, whereby a voltage on the first and second gates is boosted with respect to the voltage on the first and second sources.

In an embodiment, set forth by way of example and not limitation, an integrated circuit includes: a charge pump circuitry formed on an integrated circuit (IC) chip and having a first output node, a second output node, a power input node, and a control input node; a first protective circuit formed on the integrated circuit chip and coupling the first output node to a first IC port; a second protective circuit formed on the integrated circuit chip and coupling the second output node to a second IC port; and a third protective circuit formed on the integrated circuit chip and coupling the power input node to a power input IC port.

In an embodiment, set forth by way of example and not limitation, a power supply charge pump and protection circuit includes: charge pump circuitry having a first output node, a second output node, a power input node, and a control input node; a first protective circuit coupling the first output node to a first port; a second protective circuit coupling the second output node to a second port; a third protective circuit coupling the power input node to a power input port; and control logic coupled to the control input node of the charge pump circuitry.

An advantage of certain embodiments is that the gate-to-source voltage of the MOSFETs can be protected with a low-cost zener diode while still protecting against reverse-voltage faults. Also, by accessing the sources of the MOSFETs, the gate drive can be referenced to it reducing area and complexity. Referring the charge pump to the source improves the gate drive especially in the cold crank supply voltage range.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
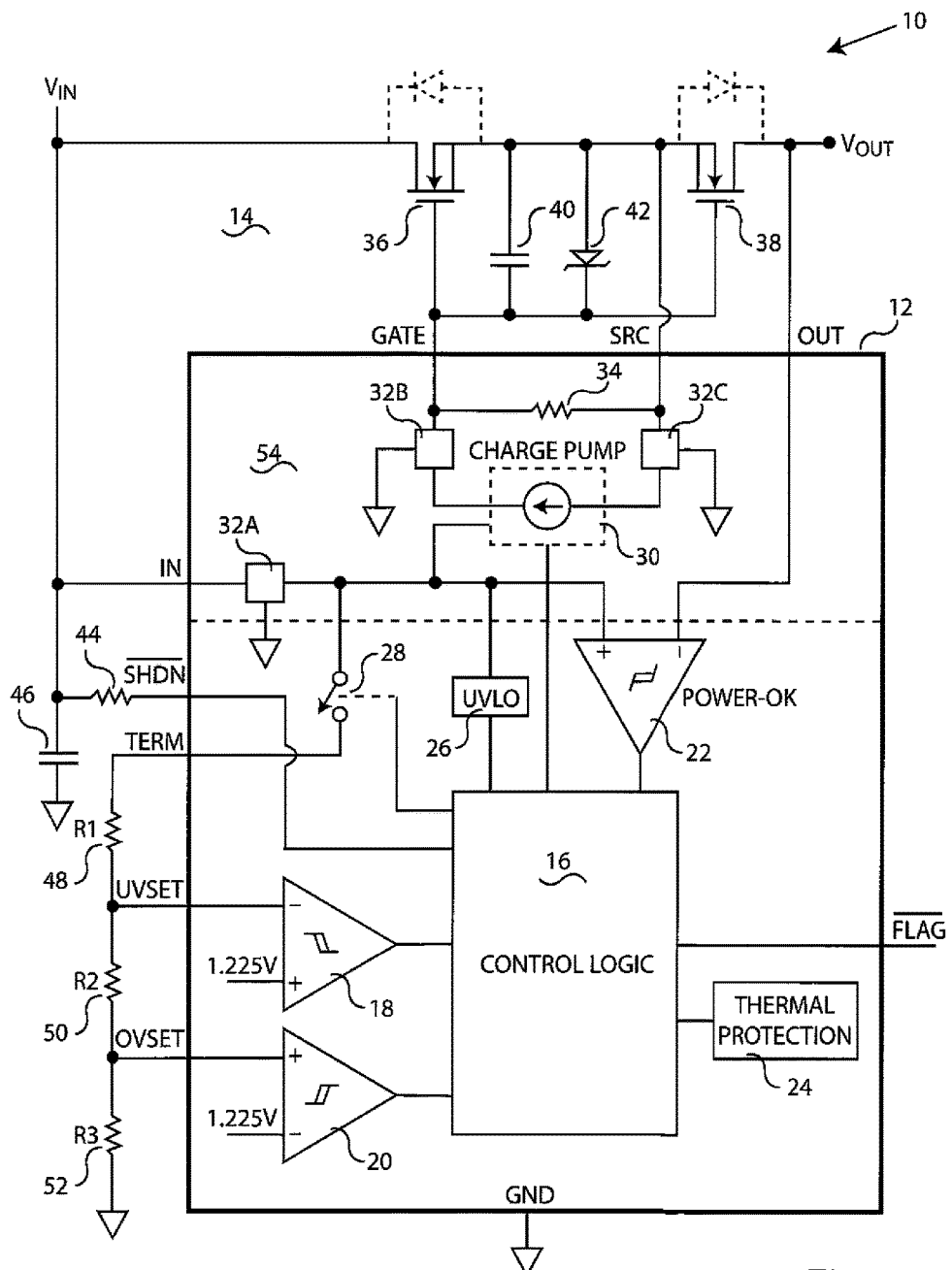
FIG. 1 is a schematic and block diagram, set forth by way of example and not limitation, of a power supply protection system.

FIG. 1 is a schematic and block diagram, set forth by way of example and not limitation, of a power supply protection system 10 including an integrated circuit (IC) 12 and external circuitry 14. In alternate embodiments the circuitry of both the integrated circuit 12 and the external circuitry 14 are implemented in discrete components, in various combinations of integrated circuits and discrete components, or entirely integrated on a single IC. The power supply protection system 10 can be coupled to a power source at a node $V_{IN}$ and can provide an output $V_{OUT}$ for, for example, a power supply or other downstream circuitry. While many of the examples set forth herein refer to the protection of power supplies, it will be appreciated that power supplies are just one type of downstream circuitries or loads that can be protected by embodiments disclosed herein.

In this example embodiment, integrated circuit 12 has ports (a/k/a pins, leads and/or contacts) IN, $\overline{\text{SHDN}}$, TERM, UVSET, OVSET, GATE, SRC, OUT, $\overline{\text{FLAG}}$ and GND and includes control logic 16, comparators 18, 20 and 22, thermal protection circuitry 24, UVLO circuitry 26, switch 28, charge pump circuitry 30, protection circuits 32A, 32B and 32C, and resistor 34. Further description of the integrated circuit 12 of this non-limiting example, can be found in the MAX16126/MAX16127 datasheet of Maxim Integrated of San Jose, Calif. for "Load-Dump/Reverse-Voltage Protection Circuits", Rev. 2: 12/12, hereafter referred to as "MAX16126", and incorporated herein by reference in its entirety.

External circuitry 14, in this non-limiting example, comprises a number of discrete active and passive components including metal oxide field effect transistors (MOSFETs) 36 and 38, capacitor 40, zener diode 42, resistor 44, capacitor 46 and resistor 48 (R1), resistor 50 (R2) and resistor 52 (R3). As will be explained in greater detail subsequently, MOSFETs 36 and 38 in this non-limiting example are back-to-back n-channel MOSFETs that turn off and isolate downstream power supplies coupled to the node $V_{OUT}$ during damaging input conditions at node $V_{IN}$.

The back-to-back n-channel MOSFETs 36 and 38 of this example are source-connected and external zener diode 42 is used to protect their gate. A charge pump 30 drives GATE port with respect to the SRC port, allowing a lower voltage rating for charge pump's components. It will be appreciated that this "back-to-back" arrangement of MOSFETs 36 and 38 provide equivalent diodes 36' and 38' as shown in phantom allowing for the blocking of both positive and negative transients.

Figure 2:
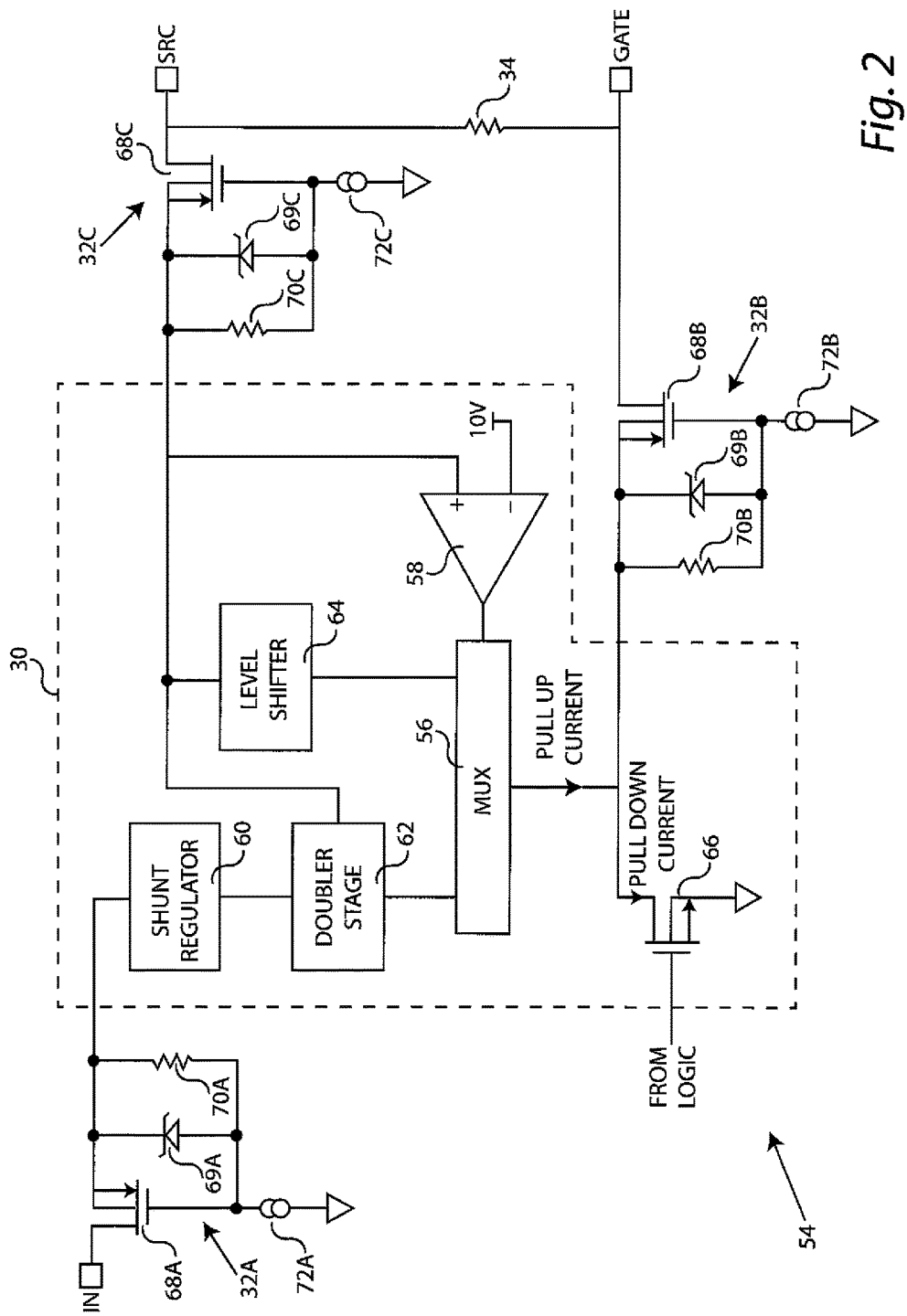
FIG. 2 is a schematic and block diagram of a charge pump and protective circuitry of the power supply protection system of FIG. 1.

FIG. 2 is a schematic and block diagram of a charge pump and protective circuitry section 54 of integrated circuit 12 of FIG. 1 illustrating the charge pump circuitry 30 and protection circuits 32A, 32B and 32C in greater detail. In this non-limiting example, charge pump circuitry 30 includes a multiplexer (MUX) 56, a comparator 58 having an output coupled to a control input of MUX 56, a series connection of a shunt regulator 60 and a doubler stage 62 coupled to a first input to MUX 56, a level shifter 64 coupled to a second input of MUX 56, and a MOSFET 66 coupled to an output of MUX 66. Both the doubler stage 62 and the level shifter 64 may be coupled to the SRC port by protection circuit 32C, while shunt regulator 60 is coupled to the IN port by protection circuit 32A. Protection circuit 32B selectively couples the output of MUX 56 and the drain of MOSFET 66 to the GATE port.

In this non-limiting example, the protection circuits 32A, 32B and 32C are similar in design and include power field effect transistors (PFETs) 68A, 68B and 68C, zener diodes 69A, 69B and 69C, resistors 70A, 70B and 70C, and optional current sources 72A, 72B and 72C, respectively. The ports exposed to reverse battery voltage (IN, GATE and SRC) are thereby connected to internal circuitry through high-voltage PFETs found in protection circuits 32A, 32B and 32C, acting as closed switches during normal operations and as reverse-biased diodes to block reverse voltage. As a further example, a 1.5 MOhm resistor 34 is connected between GATE and SRC in order to ensure that the channels of MOSFETs 36 and 28 are off during reverse battery fault. The zener diodes, which have their cathodes coupled to the sources of the PFETs and their anodes coupled to the gates of the PFETs, protect the gates of the PFETs. It will therefore be appreciated that the protection circuits 32A, 32B and 32C each include a power field effect transistor (PFET) and a parallel connection of a resistor and a zener diode coupled between a gate and a source of the PFET.

The example power supply protection circuit 10, as described herein, serves to protect power supplies from damaging input voltage conditions, including overvoltage, reverse-voltage, and high-voltage transient pulses. Using charge pump 30, the integrated circuit 12 controls the two external back-to-back n-channel MOSFETs 36 and 38 that turn off and isolate downstream power supplies during damaging input conditions, such as an automotive load-dump pulse or a reverse-battery condition.

In operation, in a non-limiting example, is as low as 3 volts to ensure proper operation during automotive cold-crank conditions. Flag output $\overline{\text{FLAG}}$ preferably asserts during fault conditions. For reverse-voltage protection, external back-to-back MOSFETs 36 and 38 outperform a traditional reverse-battery diode, minimizing the voltage drop and power dissipation during normal operation. Also, in this non-limiting example, external resistors 48-52 can be used to adjust the overvoltage and undervoltage comparator thresholds.

In this example embodiment, integrated circuit 12 uses charge pump circuitry to generate a GATE-to-SRC voltage and enhance the operation of external MOSFETs 36 and 38. In an embodiment, after the input voltage exceeds the input undervoltage threshold, the charge pump turns on after, for example, a 150 µs delay. In a farther embodiment, the GATE signal is pulled to ground with a, for example, 8.8 mA pull-down current. External zener diode 42 is connected between the gates and sources of the two external MOSFETs 36 and 38 to protect the gates of the MOSFETs. In an embodiment, the zener clamp voltage is above 10 volts and below VGS maximum rating of the MOSFETs 36 and 38.

In an embodiment, integrated circuit 12 detects overvoltage conditions using comparators such as comparators 18-22. An overvoltage condition causes the GATE output to go low, turning off the external MOSFETs 36 and 38. The $\overline{\text{FLAG}}$ output can, in certain embodiments, be asserted to indicate an overvoltage fault condition.

In an example operation, the voltage level on GATE is maintained or "enhanced" at about 9 volts above the voltage level on SRC. The output voltage is monitored through a resistive divider between OUT and OVSET. When OUT rises above the overvoltage threshold, GATE goes low and the MOSFETs 36 and 38 turn off. As the voltage on OUT falls below the overvoltage threshold minus the threshold hysteresis, GATE goes high and the MOSFETs 36 and 38 turn back on again, regulating OUT in a switched-linear mode at the overvoltage threshold.

TERM port of integrated circuit 12, in this non-limiting example, is coupled to $V_{IN}$ by switch 28, which is controlled by control logic 16. In shutdown (e.g. when $\overline{\text{SHDN}}$=GND) switch 28 is open. By connecting the voltage threshold resistive divider of resistors 48-52 to the TERM port instead of directly to $V_{IN}$, power dissipation in the resistive divider can be eliminated and the shutdown supply current reduced.

In this non-limiting example, power supply protection system 10 provided reverse-voltage protection to avoid damage to downstream circuitry connected to $V_{OUT}$ (e.g. a power supply) caused by battery reversal or negative transients. In a reverse-voltage condition, the two external n-channel MOSFETs 36 and 38 are turned off, protecting the downstream circuitry ("load") connected to $V_{OUT}$. In a non-limiting example, capacitor 46 is a 0.1 µF ceramic capacitor connected from $V_{IN}$ to GND, capacitor 40 is a 10 nF ceramic capacitor connected from GATE to SRC. Optionally, a 10 µF capacitor (not shown) can be connected from OUTPUT to GND. During normal operation, both MOSFETs are turned on and have a minimal forward voltage drop, providing lower power dissipation and a much lower voltage drop than a reverse-battery protection diode.

In this non-limiting example, power supply protection system 10 uses an external resistive divider comprising resistors 48 (R1), 50 (R2) and 52 (R3) to set the overvoltage and undervoltage thresholds. The integrated circuit 12 operates in switch mode in which the internal overvoltage comparator monitors the input voltage. The resistive divider of resistors R1, R2 and R3 is coupled between the TERM port and ground GND.

It will be appreciated that integrated circuit 12 includes internal undervoltage and overvoltage comparators 18 and 20 for window detection. GATE is enhanced to a voltage above that of SRC, as described above, n-channel MOSFETs 36 and 38 are turned on when the $V_{IN}$ is within a selected window. When the monitored voltage falls below the lower limit (VTRIPLOW) or exceeds the upper limit (VTRIPHIGH) of the window, the GATE voltage goes to GND, turning off MOSFETs 36 and 38 and protecting the load coupled to node $V_{OUT}$.

The resistor values R1, R2 and R3 of the external resistive divider can be calculated as follows:

$$V_{TRIPLOW} = (V_{TH} - V_{TH-HYS})\left(\frac{R_{TOTAL}}{R2 + R3}\right)$$

$$V_{TRIPHIGH} = V_{TH}\left(\frac{R_{TOTAL}}{R3}\right)$$

where $R_{TOTAL} = R1 + R2 + R2$, $V_{TH}$ is the 1.225 V OVSET/UVSET threshold, $V_{TH-HYS}$ is the hysteresis.

Use the following steps to determine the values for R1, R2, and R3:

1) Choose a value for $R_{TOTAL}$, the sum of R1, R2, and R3

2) Calculate R3 based on $R_{TOTAL}$ and the desired upper trip point $$R3 = \frac{V_{TH} \times R_{TOTAL}}{V_{TRIPHIGH}}$$

3) Calculate R2 based on $R_{TOTAL}$, R3, and the desired lower trip point $$R2 = \frac{(V_{TH} - V_{TH-HYS}) \times R_{TOTAL}}{V_{TRIPLOW}} - R3$$

4) Calculate R1 based on $R_{TOTAL}$, R2, and R3:

$$R1 = R_{TOTAL} - R2 - R3$$

The zener diode 42 is part of external circuitry 14 to avoid any internal n-type epitaxial ("epi") pockets at the GATE port compromising reverse battery protection. Capacitor 40 provides, in this non-limiting example, fast reverse battery voltage transient protection.

Charge pump circuitry 30 can help assure normal operations with input voltage down to 3 volts maximizing the overdrive of external MOSFETs 36 and 38, in this non-limiting example. The strategy to generate the enhancement voltage is based on a switch-over between doubler stage 62 and level shifter 64, controlled by a comparator which compares VSRC to a reference voltage, e.g. 10 volts. By way of non-limiting example, if VSRC is lower than the example 10 volts reference a MUX 56 is controlled to select the output of doubler stage 62 which is referred to shunt regulator 60 with a 5 volt shunt voltage in order to set VGS, and if VSRC is higher than the 10 volts reference, level shifter stage 64 is referred to SRC to apply a 10 volts VGS.

It will be appreciated that, in the foregoing non-limiting example, the VGS vs. $V_{IN}$ relationship is set forth as follows:

For $(3V \le V_{IN} \le 5V), V_{GATE} - V_{SRC} \approx 2 \times V_{IN}$

For $(V_{IN} \ge 5V), V_{GATE} - V_{SRC} \approx 10$ volts

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An integrated circuit comprising:
   charge pump circuitry formed on an integrated circuit (IC) chip and having a first output node, a second output node, a power input node, and a control input node, wherein the charge pump circuitry includes a multiplexer (MUX) having a first input coupled to a doubler stage and a second input coupled to a level shifter;
   control logic formed on the integrated circuit chip and coupled to the control input node of the charge pump circuitry;
   a first protective circuit formed on the integrated circuit chip and coupling the first output node to a first IC port;
   a second protective circuit formed on the integrated circuit chip and coupling the second output node to a second IC port;
   a resistor coupled across the first IC port and the second IC port; and
   a third protective circuit formed on the integrated circuit chip and coupling the power input node to a power input IC port;
   wherein the first protective circuit, the second protective circuit and the third protective circuit each include a power field effect transistor (PFET) and a resistor coupled between a gate and a source of the PFET, wherein the sources of the PFETs are coupled to the charge pump circuitry.

2. An integrated circuit as recited in claim 1 wherein the MUX further includes a comparator having an output coupled to an input of the MUX.

3. An integrated circuit as recited in claim 1 wherein the charge pump circuit further includes a MOSFET having a drain coupled to an output of the MUX and having a gate coupled to the control logic.

4. An integrated circuit as recited in claim 1 wherein the charge pump circuit further includes a shunt regulator coupled to the doubler stage.

5. A power supply charge pump and protection circuit comprising:
- charge pump circuitry having a first output node, a second output node, a power input node, and a control input node, wherein the charge pump circuitry includes a multiplexer (MUX) having a first input coupled to a doubler stage and a second input coupled to a level shifter;
- a first protective circuit coupling the first output node to a first port;
- a second protective circuit coupling the second output node to a second port;
- a resistor coupled across the first port and the second port;
- a third protective circuit coupling the power input node to a power input port; and
- control logic coupled to the control input node of the charge pump circuitry;
- wherein the first protective circuit, the second protective circuit and the third protective circuit each include a power field effect transistor (PFET) and a resistor coupled between a gate and a source of the PFET; and
- wherein the sources of the PFETs are coupled to the charge pump circuitry.

6. A power supply charge pump and protection circuit as recited in claim 5 wherein the MUX further includes a comparator having an output coupled to an input of the MUX.

7. A power supply charge pump and protection circuit as recited in claim 5 wherein the charge pump circuit further includes a MOSFET having a drain coupled to an output of the MUX and having a gate coupled to the control logic.

8. A power supply charge pump and protection circuit as recited in claim 5 herein the charge pump circuit further included a shunt regulator coupled to the doubler stage.

* * * * *